Patented Apr. 28, 1953

2,636,864

UNITED STATES PATENT OFFICE 2,636,864

SUPPORTED MgCl₂-CuCl₂ CATALYST

David J. Pye and Theo John West, Concord, Calif., assignors to The Dow Chemical Company, Midland, Mich., a corporation of Delaware No Drawing. Application March 7, 1951, Serial No. 214,430

4 Claims. (Cl. 252—441)

This invention relates to a reaction mass of improved catalytic activity for use in the oxychlorination of hydrocarbons or of partially chlorinated hydrocarbons.

The term "oxychlorination" is used herein as elsewhere in the art to refer to a reaction in which the source of chlorine employed for the chlorination reaction is gaseous hydrogen chloride which is made to give up its chlorine in useful form through a well known series of reactions involving oxygen and copper chlorides or the chlorides of other metals of variable valence. The copper chlorides are normally supported on a presumably inert carrier, which is preferably quite porous. The reactions of this type may be carried out by conducting the hydrocarbon, hydrogen chloride and air over a fixed bed of the supported copper compound, or by causing them to flow countercurrent to a moving bed of the copper chlorides, or by causing them to "fluidize" and react with an agitated mass of the copper chloride impregnated carrier in a finely divided state.

There have been numerous publications proposing various catalytically reactive compositions which have been said to offer advantage over the chlorides of copper for use in such reactions. It has been found, however, that while each of the agents which it has been proposed to mix with copper chloride may have some particular beneficial effect on the reaction, few of them actually increase the extent to which the hydrocarbon is chlorinated in a single pass through the system, or the efficiency with which the hydrogen chloride is transformed to chlorinated compounds. Some of them even depress the reaction rates. In many instances it has been found that the catalytically active metal chlorides tend to vaporize and become deposited on the walls of the reaction vessel, or to be deposited on those walls as a scale while the solid reaction mass moves past those walls at the reaction temperature.

It is among the objects of the present invention to provide a reaction mass for use in oxychlorination of hydrocarbons, having a higher degree of activity than cupric chloride or oxychloride alone in converting hydrocarbons to chlorohydrocarbons. A further object is to provide such a catalytically active composition of matter which will exhibit greater efficiency than the chlorides of copper in utilizing hydrogen chloride in an oxychlorination reaction. A related object is to provide such a mass which exhibits a reduced tendency to deposit a scale comprising metal chlorides on the walls of the reaction vessel. Other objects may appear hereinafter.

The new and improved reaction mass of the present invention consists essentially of a chloride of copper and from 0.1 to 0.65 mol of magnesium chloride per mol of copper compound, both supported on a porous and inert carrier, which is preferably calcined diatomaceous earth (Lompoc, California diatomite, of the type sold by Johns-Manville Corporation as "Celite 22" being preferred. The preferred ratio of magnesium chloride to copper compounds is from 0.2 to 0.35 mol of magnesium chloride for each mol of copper compound (cupric chloride, cuprous chloride and cupric oxychloride).

It has been found that the preferred carrier (Celite 22) has the requisite chemical inertness in oxychlorination reactions, as well as an optimum porosity and high resistance to attrition loss in either a moving bed or a fluid bed reactor. It has a total pore volume of over 0.5 cc. per gram, and at least 80 per cent of this pore volume is in the form of macropores. The surface area is at least 1 square meter per gram, and the ratio of volume to surface, computed as the radius of an assumed uniform circular cylinder having the total pore surface and total pore volume, is at least 1800 Ångstroms. These pores are of greater diameter than the mean free path of any of the reagent gases present in the oxychlorination of hydrocarbons, so that when impregnated with the copper reagents, the effective surface is of much greater area than is represented by the external and roughly spherical surfaces of the carrier particles. Every other carrier tested, under uniform test conditions, gave a lower per cent attack, or a lower per cent conversion (both as defined hereinafter), or both.

In order to compare the new composite reagent with others heretofore known, a standard procedure was adopted. The preferred calcined diatomaceous earth (Celite 22) was crushed and screened to recover the particles passing a 6 mesh screen and resting on a 20 mesh screen (U. S. Sieve Series). To each liter of this porous and inert carrier was added an aqueous solution of 2.6 mols of cupric chloride. In the comparative tests reported in the following tables, there was added to the aqueous solution 0.65, 1.3 or 2.6 mols of a salt of another metal, identified in the tables. The impregnated diatomaceous earth was dried and the resulting product was used to fill a fixed bed reaction tube. The copper chloride was reduced to the cuprous state by passing methane, or other hydrocarbon gas therethrough. Air was then passed through the tube at 350° C., at a rate to provide a residence time for air in the tube of about 0.3 minute. This converted the cuprous chloride to cupric oxychloride. An equimolar mixture of methane and hydrogen chloride was passed through the tube at the temperature shown in the table, and at rates to provide the indicated contact times, usually from 0.15 to 0.35 minutes. The effluent products were analyzed and calculations were made to determine the effectiveness of the solid reaction mass. In the tables, the values designated "Per cent Attack," "Per cent Efficiency" and "Per cent Conversion" have the following meanings:

Percent Attack =

$$\frac{\text{mols of hydrocarbon entering into any reaction}}{\text{mols of hydrocarbon charged}} \times 100$$

Percent Efficiency =

$$\frac{\text{mols chlorinated hydrocarbons produced}}{\text{mols hydrocarbon consumed in all reactions}} \times 100$$

Percent Conversion =

$$\frac{\text{mols chlorinated hydrocarbons produced}}{\text{mols hydrocarbon charged}} \times 100$$

The final columns in the tables represent the per cent change in "attack" and "conversion" effected by the reaction mass under study as compared with the results obtained under otherwise identical reaction conditions using diatomite-supported copper oxychloride alone as the solid reaction mass.

Table I

| Solid Reaction Mass | | Average Reactor Temp., °C. | Contact Time, Min. | Percent Attack | Percent Efficiency | Percent Conversion | Product Distribution, Mol percent | | | | Percent Change compared with copper alone | |
|---|---|---|---|---|---|---|---|---|---|---|---|---|
| Mols Copper Oxychloride | Mols Magnesium Chloride | | | | | | $CH_3Cl$ | $CH_2Cl_2$ | $CHCl_3$ | $CCl_4$ | Attack | Efficiency |
| 1.0 | none | 388 | 0.32 | 35 | 78 | 27 | 60 | 32 | 7 | 0 | ----- | ----- |
| 1.0 | 0.25 | 389 | 0.38 | 49 | 66 | 32 | 54 | 35 | 11 | 1 | +40 | +18 |
| 1.0 | none | 396 | 0.15 | 45 | 67 | 30 | 60 | 31 | 9 | 0 | ----- | ----- |
| 1.0 | 0.25 | 400 | 0.16 | 47 | 77 | 36 | 56 | 32 | 11 | 1 | +4.5 | +20 |
| 1.0 | none | 405 | 0.33 | 44 | 70 | 31 | 56 | 38 | 6 | 0 | ----- | ----- |
| 1.0 | 0.5 | 405 | 0.33 | 64 | 54 | 34 | 44 | 38 | 17 | 1 | +45 | +10 |
| 1.0 | none | 412 | 0.34 | 77 | 32 | 24 | 45 | 40 | 13 | 3 | ----- | ----- |
| 1.0 | 0.5 | 410 | 0.34 | 72 | 46 | 33 | 36 | 36 | 23 | 5 | −6 | +37 |

Runs made in a similar manner, but with 1 mol of magnesium chloride per mol of copper oxychloride, were characterized by producing unduly large proportions of carbon dioxide, that is, the oxidation reaction took precedence over the chlorination reaction. On the basis of the reported typical results, and numerous other exploratory runs, it was determined that advantageous results are obtained when there is present from 0.1 to 0.65 mol, and preferably 0.2 to 0.35 mol of magnesium chloride per mol of copper compound. Within these ranges, it has been observed in large scale operations that as the amount of magnesium chloride is increased, the amount of scale deposited on the reactor is decreased.

The value of magnesium chloride as a promotor or activator for copper in the oxychlorination of hydrocarbons is further illustrated in Table II, wherein the comparison in each case is made with a run using copper alone at the same temperature and under otherwise identical conditions. The various promoters were usually supplied as the chlorides, but are reported below only by name of the cationic metal.

Table II

| Added Promoter | | Percent change in reaction as compared with copper alone | |
|---|---|---|---|
| cationic metal | mols per mol of copper | Attack | Conversion |
| magnesium | 0.25 | +40 | +18 |
| Do | 0.5 | +45 | +10 |
| thorium | 0.5 | +14 | −35 |
| chromium | 0.5 | +11 | −15 |
| Do | 0.25 | −25 | −19 |
| manganese | 0.5 | +15 | −3 |
| calcium | 0.5 | −5 | +8 |
| cerium | 0.5 | 0 | +20 (note) |
| cobalt | 0.5 | −11 | +20 |
| nickel | 0.5 | −22 | −27 |
| cadmium | 0.5 | −30 | −24 |
| zinc | 0.5 | −2 | −67 |
| potassium | 0.5 | −41 | −47 |

(NOTE.—Cerium did not alter the percent attack, as compared with copper, and gave an increased conversion of the attacked hydrocarbon to chlorohydrocarbons, but the hydrogen chloride efficiency was very low.)

It is observed that the presence of magnesium chloride with the copper oxychloride causes more of an increase in the amount of hydrocarbon reacted per pass through the system than any other metal chloride tested, and that, when magnesium chloride is used in accordance with the present invention there is also a significant increase in the proportion of chlorinated hydrocarbons formed.

The invention has been illustrated with respect to the mixture of magnesium chloride and a chloride of copper supported on the preferred porous calcined diatomaceous earth. When the same mixture of chlorides is supported on the other carriers disclosed in the art, such as porous clay, pumice, and the like, and improvement is observed similar to that reported for the preferred composite reagent mass. The best results have been obtained, however, when the preferred carrier is employed.

The term "chloride of copper" as employed herein is intended to mean any one or a mixture of cupric chloride, cuprous chloride and cupric oxychloride which are converted from one to the other in the well known series of reactions occurring in the oxychlorination of hydrocarbons.

We claim:

1. A solid reaction mass of high catalytic activity for use in the oxychlorination of hydrocarbons consisting essentially of a porous and substantially inert carrier impregnated with a chloride of copper and with from 0.1 to 0.65 mol of magnesium chloride per mol of the copper compound.

2. A solid reaction mass of high catalytic activity for use in the oxychlorination of hydrocarbons consisting essentially of a porous calcined diatomaceous earth impregnated with a chloride of copper and with from 0.1 to 0.65 mol of magnesium chloride per mol of the copper compound.

3. A solid reaction mass of high catalytic activity for use in the oxychlorination of hydrocarbons consisting essentially of a porous calcined diatomaceous earth impregnated with a chloride of copper and with from 0.2 to 0.35 mol of magnesium chloride per mol of the copper compound.

4. A solid reaction mass of high catalytic activity for use in the oxychlorination of hydrocarbons, consisting essentially of a chloride of copper, and from 0.1 to 0.65 mol of magnesium chloride per mol of the copper compound, carried on and in the pores of a calcined diatomaceous earth having a total pore volume of over 0.5 cc. per gram, at least 80 per cent of the pore volume being in the form of macropores, and having a surface area of at least 1 square meter per gram, the ratio of volume to surface, computed as the radius of an assumed uniform circular cylinder having the total pore surface and total pore volume, being at least 1800 Å.

DAVID J. PYE.
THEO JOHN WEST.

References Cited in the file of this patent

UNITED STATES PATENTS

| Number | Name | Date |
| --- | --- | --- |
| 2,496,621 | Deery | Feb. 7, 1950 |
| 2,547,928 | Davis et al. | Apr. 10, 1951 |